(12) United States Patent
Grzeczkowski

(10) Patent No.: US 6,687,486 B2
(45) Date of Patent: Feb. 3, 2004

(54) METHOD AND APPARATUS TO CONFIGURE, PROVISION AND CONTROL A SET-TOP TERMINAL

(75) Inventor: Richard Stephen Grzeczkowski, Yardley, PA (US)

(73) Assignee: General Instrument Corporation, Horsham, PA (US)

(*) Notice: Subject to any disclaimer, the term of this patent is extended or adjusted under 35 U.S.C. 154(b) by 50 days.

(21) Appl. No.: 10/062,784

(22) Filed: Jan. 31, 2002

(65) Prior Publication Data

US 2003/0143946 A1 Jul. 31, 2003

(51) Int. Cl.[7] ................................................ H04N 7/173
(52) U.S. Cl. .................. 455/3.05; 455/3.06; 725/81; 725/132; 725/151; 725/110; 709/217
(58) Field of Search ........................ 455/3.05, 3.1, 455/5.2, 3.06; 348/12, 6; 725/132, 151, 152, 131, 146, 81, 123, 105, 114, 116, 144; 709/217

(56) References Cited

U.S. PATENT DOCUMENTS 5,999,970 A * 12/1999 Krisbergh et al. .......... 725/109
6,081,533 A * 6/2000 Laubach et al. ............ 370/421
6,408,437 B1 * 6/2002 Hendricks et al. .......... 725/132
2002/0059642 A1 * 5/2002 Russ et al. ................. 725/135

* cited by examiner

Primary Examiner—Nay Maung
Assistant Examiner—Alan T. Gantt
(74) Attorney, Agent, or Firm—Mayer Fortkort & Williams, PC; Mark K. Young, Esq.; Karin L. Williams, Esq.

(57) ABSTRACT

A method and apparatus to configure, provision and control a set-top terminal using a wireless web appliance is provided where a wireless communications path is established between the wireless web appliance and the set-top terminal. The set-top terminal is arranged to communicate with a headend controller over a bi-directional communication link having both upstream and downstream communication paths. A configuration change is implemented in response to an unsolicited message that is generated by the set-top terminal and received by the headend controller over the upstream communications path. The configuration change is implemented at the headend, or at the set-top terminal by downloading configuration data from the headend controller over the downstream communication path. The set-top terminal transmits the unsolicited message in response to a control signal generated by the wireless web appliance that is received over the wireless communications path.

21 Claims, 9 Drawing Sheets

METHOD AND APPARATUS TO CONFIGURE, PROVISION AND CONTROL A SET-TOP TERMINAL

BACKGROUND OF THE INVENTION

This invention relates to electronic devices, and more particularly, to a method and apparatus to configure, provision and control a set-top terminal using a wireless web appliance.

The set-top terminals that are used in consumer's homes to receive a wide variety of entertainment and information services are increasing in complexity as more advanced and interactive features are developed and deployed. Sophisticated levels of both networking and processing power are increasingly enabled. Flexible and configurable user interfaces for on-screen menu control, VCR and event timers, remote control, interactive program guides, and personal messages (to name just a few typical features) must be accommodated in the set-top feature set. Set-top terminals are often designed to support multiple operating systems, middleware packages, and applications in order to provide the various video, audio and communication services (such as email and web-browsing) demanded by the customer. Security and encryption technologies must also be embedded in the set-top terminal to protect data integrity and ensure proper service provisioning and subscription billing events. As multiple system operators ("MSOs") are facing continual market demands to reduce operational costs and capital investments, it has thus become necessary to create tools that can reduce the time and effort required to track, configure, control and provision today's complex set-top terminal in both warehouse and field environments. In addition, cable operators are looking to benefit from lower upfront investments in control system equipment.

SUMMARY OF THE INVENTION

A method and apparatus to configure, provision and control a set-top terminal using a wireless web appliance is provided where a wireless communications path is established between the wireless web appliance and the set-top terminal. The set-top terminal is arranged to communicate with a headend controller over a bi-directional communication link having both upstream and downstream communication paths. A configuration change is implemented in response to an unsolicited message that is generated by the set-top terminal and received by the headend controller over the upstream communications path. The configuration change is implemented at the headend, or at the set-top terminal by downloading configuration data from the headend controller over the downstream communication path. The set-top terminal transmits the unsolicited message in response to a control signal generated by the wireless web appliance that is received over the wireless communications path.

In an illustrative embodiment of the invention, a compact wireless web appliance is arranged as a web client and handheld computing device that is arranged with a user interface and display so that data may be entered and transmitted to a remotely-located set-top terminal equipped with wireless communication capability. Data received from the set-top terminal may be processed and displayed by the wireless web appliance. The data is sent and received between the wireless web appliance and the set-top terminal using a wireless broadband communication protocol, such as IEEE 802.11b. The wireless web appliance is optionally provided with a wireless communications interface for communications with remotely-located network server equipment or digital headend equipment that are equipped with wireless communications capability. In addition, the wireless web appliance may be arranged to operate in a broadcast mode to simultaneously control a large number of set-top terminals and associated peripheral devices.

A user interacts with the wireless web appliance, for example in a warehouse environment, in order to streamline the configuration of set-top terminals prior to their installation in the field. A bi-directional transport and translation facility, such as cable plant, couples the set-top terminal to the remote headend controller. Under control of the wireless web appliance, the set-top terminal sends an unsolicited message over the cable plant to request a configuration change. In response to the unsolicited message, the headend controller may make a change in a configuration record associated with the set-top terminal at the headend controller or coupled business system, or send configuration data to the set-top terminal to implement the desired set-up at the set-top terminal. The requested configuration change may include, for example, the entry of a particular set-top terminal into the warehouse controller database, the configuration of the set-top terminal to receive a particular middleware package, the authorization and provision of a set-top terminal with a particular service or feature set, the setting of the set-top terminal on or off the cable plant, or the initialization (i.e., reset) of the set-top terminal.

In another embodiment of the invention, the wireless web appliance communicates with a wireless network-enabled server, located in the warehouse, over the optional wireless communications interface. Under the control of the wireless web appliance, the server transmits an unsolicited message to the headend controller to trigger a configuration record change at the headend or the downloading of configuration data to a set-top terminal over the cable plant.

In other embodiments of the invention, the wireless web appliance is arranged to communicate with peripheral devices in the field that are coupled to a set-top terminal or are otherwise equipped with wireless communications capabilities. Accordingly, the wireless web appliance may be used to configure peripheral equipment (e.g. printers, audio devices, video recorders, cameras, MP3 players, etc.) that are connected and arranged to exchange data with the set-top terminal. Other field applications of the invention include diagnosis and troubleshooting of set-top terminal and peripheral device faults, electronic signature capture, the provisioning of services and features, system performance data capture, and service call scheduling and logging. A printer interface is optionally arranged in the wireless web appliance to provide technicians with a convenient way to print out receipts and other documentation for customers in the field.

A software application running on the wireless web appliance facilitates the user interaction with the set-top terminal and/or server in both warehouse and field environments. The application manages the user interface and two-way communication wireless communications and generates the control signals necessary to enable the unsolicited message feature.

An embodiment of the wireless web appliance that is directed to consumer use is also provided. In this embodiment, the wireless web appliance is arranged to provide an end-user-appropriate set of configuration options to set up and control the set-top terminal and related peripheral devices. The data capture feature of the wireless web appliance, for example as a way to implement electronic signature capture, affords a simple and secure way for consumers to authorize specific services, such as pay-per-view events, or to participate in on-line shopping and auction events. The two-way communications feature of the wireless web appliance may also provide a convenient way for consumers to obtain diagnostic and system status information that may be used to resolve service problems more quickly. Context-sensitive help (obtained from either local memory or downloaded from the headend controller) may be displayed on the wireless web appliance to assist the consumer in both setup and fault resolution modes.

Advantageously, the user interface and display provided by wireless web appliance affords the user with real time feedback of the configuration status of the set-top terminal, related peripheral devices, and broadband system. In warehouse and field environments, such functionality drives much quicker set-top terminal configuration and fault diagnosis as control features that are normally reserved for the headend controller are now provided by the invention in the immediate vicinity of the set-top terminal. In the warehouse, a technician may thus configure the set-top terminal and immediately view the results on the wireless web appliance display to verify the configuration status without having to physically access the headend controller (that may be located some distance away from the set-top terminal being configured). In the field, telephones call to the MSO's call center can be minimized because most of the call center functionality may be requested via an unsolicited message provided by the inventive arrangement.

DETAILED DESCRIPTION

Figure 1:
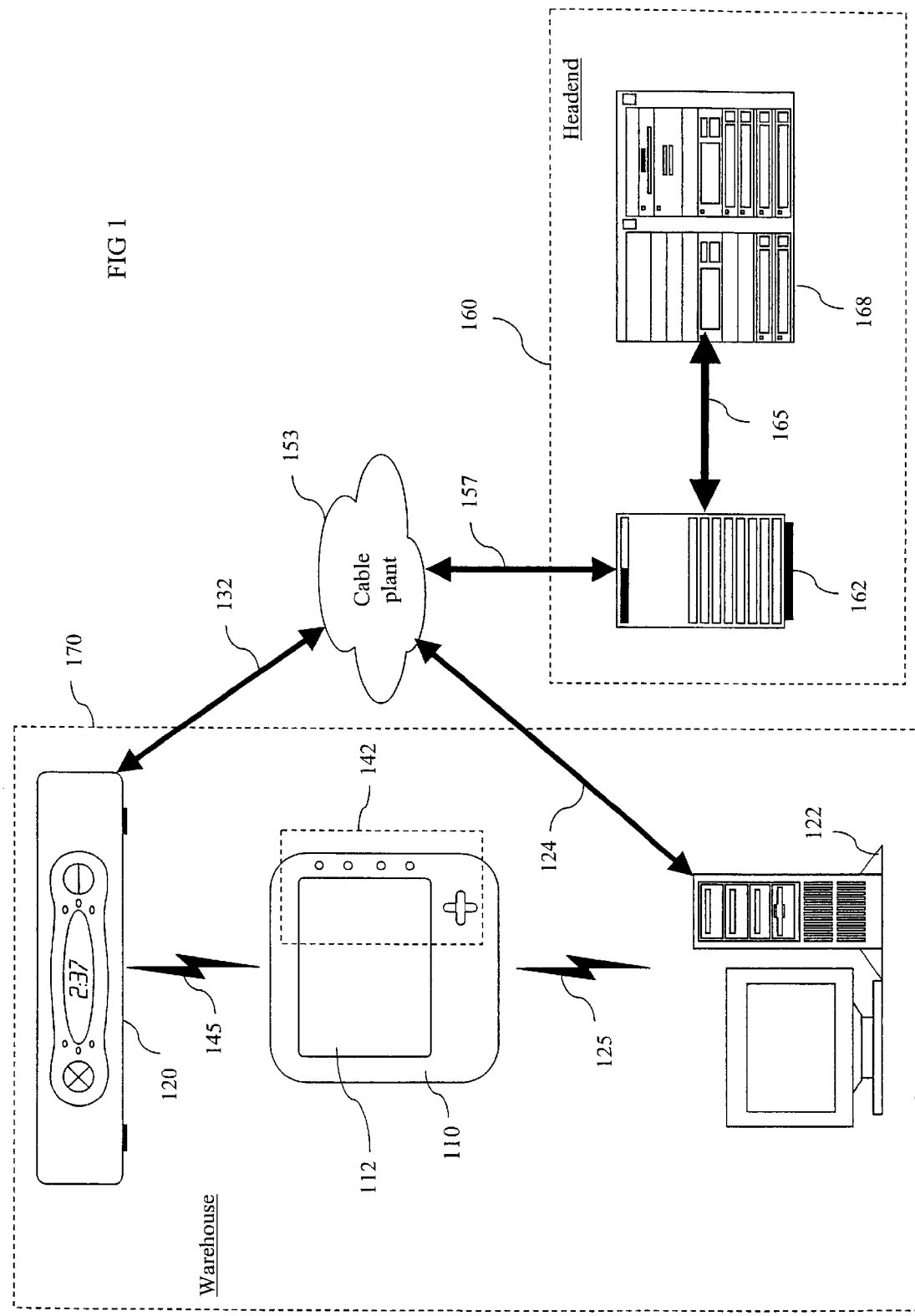
FIG. 1 is a simplified functional block diagram of an illustrative embodiment of the invention including a set-top terminal and a wireless web appliance that are arranged for use in a warehouse environment.

Referring to FIG. 1, there is shown an illustrative embodiment of the invention that is arranged for use in a warehouse environment where set-top terminals are typically configured in quantity prior to being installed in the field (i.e., in a service subscriber or customer's home). As shown in FIG. 1, a set-top terminal 120 is coupled (via connection 132) to cable plant 153 that provides data and control signal transport and translation between the set-top terminal 120 and a headend 160. Cable plant 153 may comprise a hybrid optical fiber and coaxial cable ("HFC") distribution network that is enabled with bi-directional communications capability, where data may flow both upstream from the set-top terminal to the headend, and downstream from the headend to the set-top terminal. Alternatively, conventional co-axial cable arrangements may be used where the signals propagate in the electrical domain only. Upstream transport may be implemented, in some applications, using a modem on a telephone network, such as the public switched telephone network (not shown in FIG. 1).

Set-top terminal 120, in this illustrative example, is a digital addressable set-top terminal that is used in a conventional manner to provide a variety of information and entertainment services into a customer's home. In accordance with the invention, set-top terminal 120 includes a wireless transceiver (not shown in FIG. 1) to send and receive wireless signals to and from wireless web appliance 110 over bi-directional wireless link 145. While infrared communications protocols may be used to implement the wireless communications, in most applications of the invention, a connection providing broader bandwidth is more preferable. For example, wireless radio frequency ("RF") protocols, such as IEEE 802.11b, Bluetooth®, RangeLAN® or HomeRF®, provide higher data rates and are not limited to line-of-sight applications.

Wireless web appliance 110 is typically selected from the group of battery-powered, handheld devices that combine wireless transceiver, computer processor, memory, display and input devices with a web browser-type application that allows a combination of graphics and text (and in some cases, audio and motion video) to be displayed using data received over the wireless link 145. Wireless web appliances may include a touch screen (i.e., a transparent touch-sensitive panel), as indicated by reference numeral 112 in FIG. 1, that provides for user input through touching or tapping appropriate icons and menu selections, typically using a stylus as a pointing device. In some applications of the invention, it may be desirable to capture data input through the recognition of handwritten symbols on the touch screen 112. In other applications, virtual keyboards and number pads may be displayed on touch screen 112 to provide for data entry by the user. Physical buttons, as shown by reference numeral 142 in FIG. 1, may be used as alternative input devices or supplements to the touch screen 112. External input devices (e.g., keyboard, mouse, bar-code scanner, etc.), external display devices (e.g., large format monitor), feature expansion and peripherals (e.g., memory card, printer) may be supported by wireless web appliance 110 through the use of conventional I/O interfaces and expansion slots.

Wireless web appliances are also referred to as "web pads" and may be used to provide World Wide Web access to users via an internet connection provided from the set-top terminal as an enhancement to the television viewing experience, or as a standalone feature. However, it is emphasized that World Wide Web access is not required to implement the principles of the invention.

The wireless web appliance 110 may be realized in a purpose built device with the appropriate hardware and software to implement the features and functions described herein. In some applications of the invention, however, other devices such as personal digital assistants ("PDAs"), compact personal computers (often referred to as "Pocket PCs"), web tablet devices, and the like, may be modified or integrated with add-on modules to provide the appropriate feature set. For example, a PDA provides a user interface, display and hardware and operating system base that, when supplemented by wireless connectivity hardware and the appropriate software to implement the unsolicited message control signal, may be suitable for use in many applications of the invention.

Headend 160 includes a controller 162 that is coupled via connection 165 to a business system 168. Controller 162, in this illustrative embodiment, is a digital addressable controller that aggregates data from external sources and controls the transmission of data and controls signals over the cable plant 153 to distribution nodes and set-top terminals on the network through connection 157 in FIG. 1. Business system 168 comprises an electronic system that stores and manages end-user account information such as service subscription data, user profiles, financial information and other data pertaining to an MSO's business operations. It is noted that while controller 162 and business system 168 are shown as being co-located in headend 160, it is not necessary that these systems physically occupy the same premises to facilitate the practice of the invention.

As noted above, set-top terminal 120 and wireless web appliance 110 are utilized in a warehouse environment which is indicated by the reference numeral 170 in FIG. 1. In many warehouse environments, a warehouse network server 122 (typically comprising a network computer server) is located on premises with connectivity to the cable plant via connection 124. Warehouse server 122 thus provides an additional communication path between the warehouse 170 and headend 160. Warehouse server 122, in accordance with the invention, may be optionally provided with wireless communications capability to provide an alternative wireless link (indicated by reference numeral 125) to wireless web appliance 110.

Figure 2:
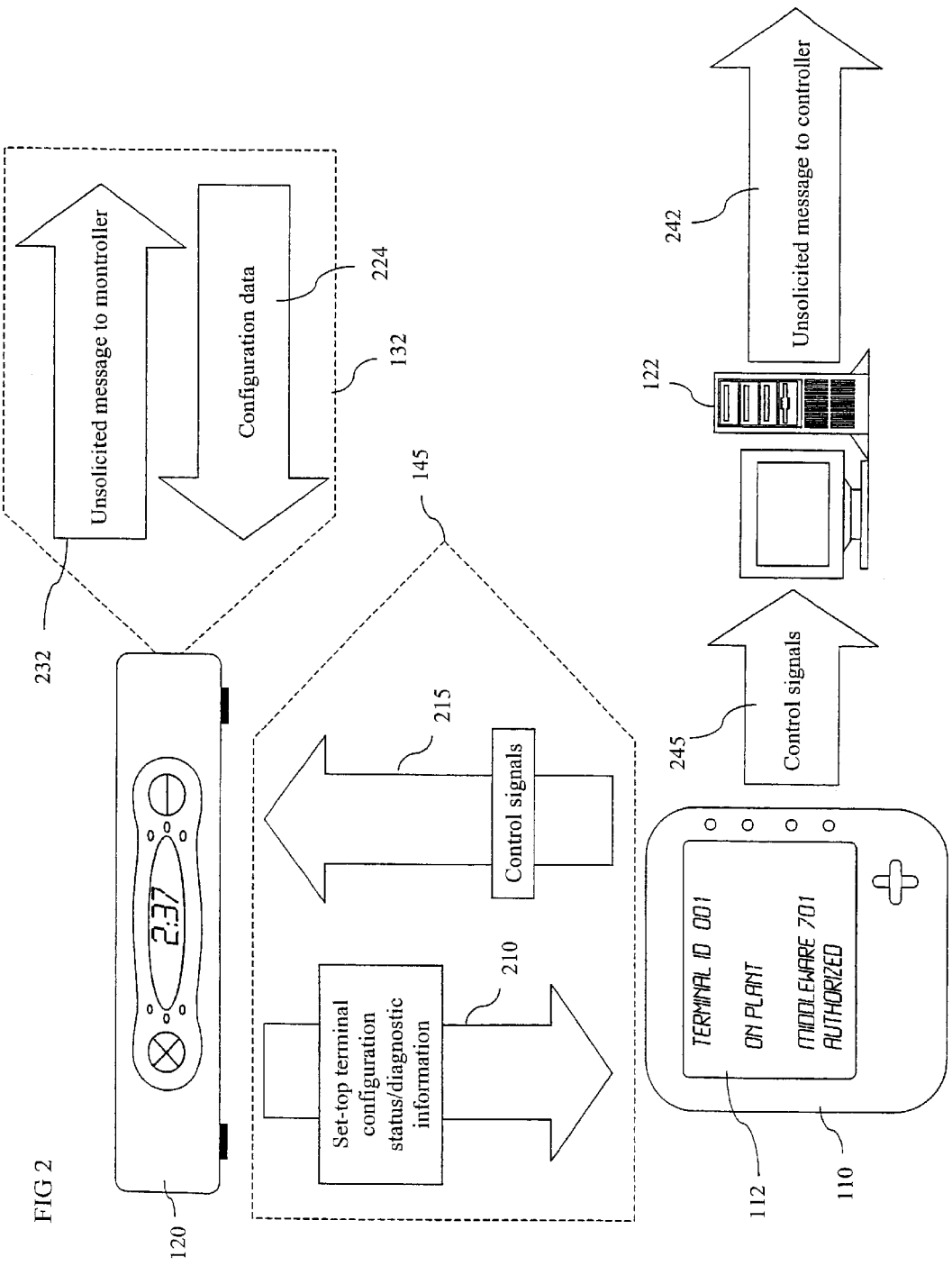
FIG. 2 depicts details of the signal and data flow among a wireless web appliance, set-top terminal, and controller, as illustratively arranged for use in a warehouse environment.

Referring now to FIG. 2, details of the signal and data flow among the wireless web appliance 110, set-top terminal 120, controller 162 (FIG. 1) and warehouse server 122 are depicted in this illustrative warehouse application of the invention. Wireless web appliance 110 generates control signals 215 that are sent over the wireless link 145 to set-top terminal 120. The control signals 215 may be used to query the set-top terminal 120 as to its configuration status which is then returned over wireless link 145 back to wireless web appliance 110. Diagnostic data pertaining to the set-top terminal and its connection to the HFC network may also be returned. Such returned information is collectively indicated by reference numeral 210 in FIG. 2. Wireless web appliance 110 processes the status information 210 for display of pertinent information on display 112.

The control signal 215 is used, in accordance with the invention, to trigger the transmission of an unsolicited message 232 from the set-top terminal 120 to controller 162 via connection 132 and the upstream path of cable plant 153 (FIG. 1). An unsolicited message is defined here as one that is generated without any previous action being required, nor is the message transmitted as the direct result of a request or a response from the controller 162. Thus, the unsolicited message 232 in not "expected" by the controller 162 prior to its receipt. In accordance with the invention, unsolicited message 232 prompts a configuration change associated with set-top terminal 120. As noted above, the configuration change may include, for example, the entry of a particular set-top terminal into the warehouse controller database, the configuration of the set-top terminal to receive a particular middleware package, the authorization and provision of a set-top terminal with a particular service or feature set, the setting of the set-top terminal on or off the cable plant, or the initialization (i.e., reset) of the set-top terminal.

Figure 3:
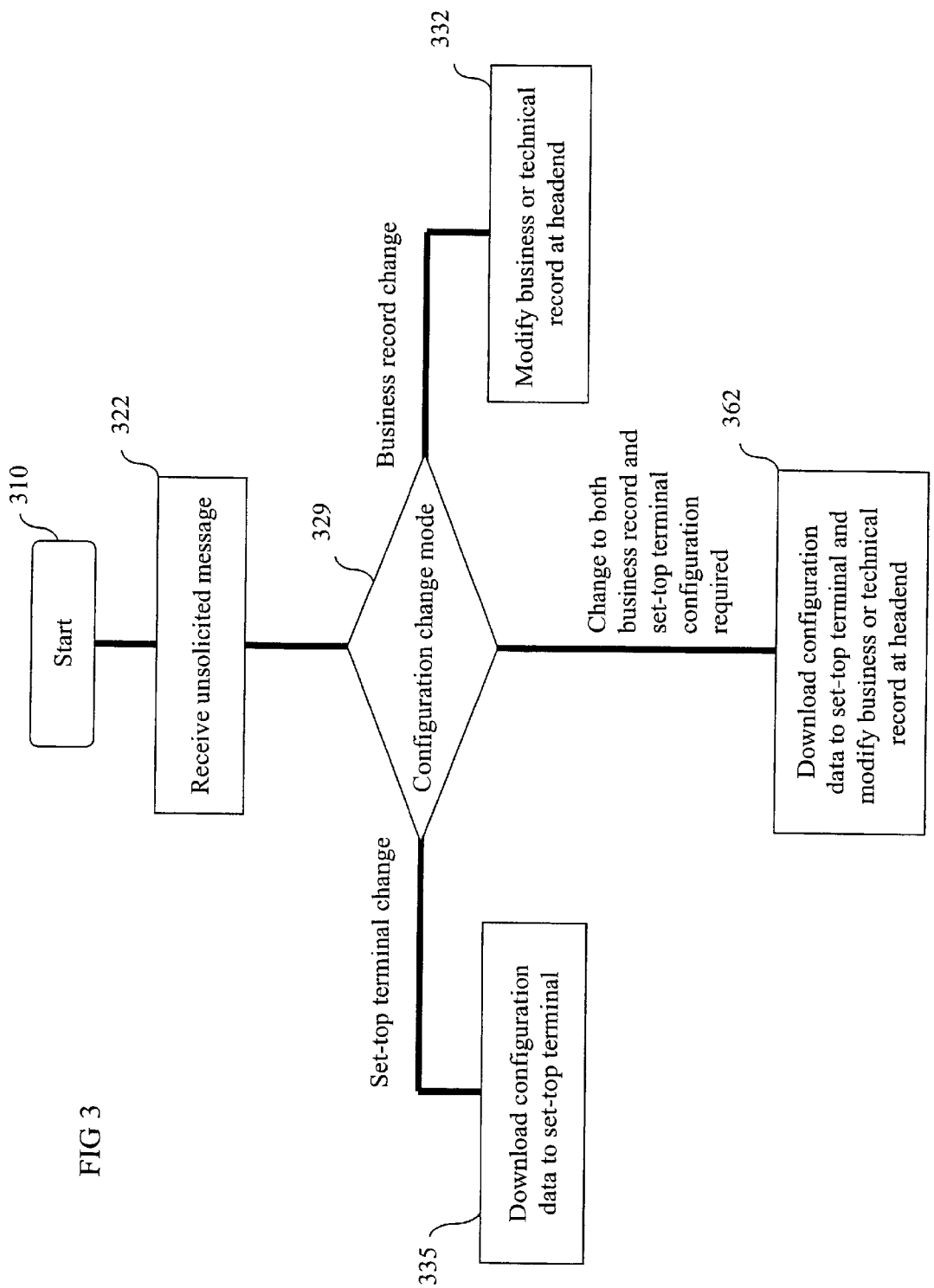
FIG. 3 is a flowchart that illustrates a method for implementing a configuration change in accordance with the invention.

The configuration change associated with set-top terminal 120 may be implemented at the headend 160, at the set-top terminal 120 itself, or by using a combination of both a change at the set-top terminal and headend. The configuration change methodology is illustrated by FIG. 3. The process starts at block 310. At block 322, the controller 162 receives the unsolicited message 232. The controller determines the required mode of configuration change at decision block 329. If the configuration change requires action at the set-top terminal only, as indicated at block 335, then the controller 162 will download the pertinent configuration data. For example, a technician at warehouse location 170 may wish to set up set-top terminal with an initialization setting that requires the local time or other system-independent information to be downloaded from the controller 162. In such a scenario, no business, technical or other records must be modified at the controller 162 or business system 168 at headend 160 (FIG. 1) to completely implement the configuration change.

Alternatively, as indicated in block 332, a configuration change may be implemented by the controller 162 by modifying or adding a business or technical record at the headend, but without requiring the downloading of any particular configuration data to the set-top terminal 120. For example, the set-top terminal ID may be entered as a record into the database of controller 162.

Referring back to FIG. 2, the field technician may query the set-top terminal 120 on a real time basis to get immediate confirmation that the configuration change was implemented. For example, as shown on the display 112, configuration status is returned from set-top terminal 120 over wireless link 145 to indicate that terminal ID 001 has been set on plant and is authorized for middleware package 701, which as indicated in the text accompanying FIG. 3, may illustratively be used to implement a particular service feature set such as interactive television. Any required configuration data downloaded from controller 162 (indicated by reference numeral 224) is received by the set-top terminal 120 over the cable plant 153 over connection 132 (FIG. 1).

Returning to FIG. 3, as indicated by block 362, a configuration change may also be implemented by using a combination of record modification at the headend and configuration download to the set-top terminal. For example, provisioning the set-top terminal 120 for a particular service (such as interactive television) might require both the downloading of service-specific middleware to the set-top terminal 120 to implement the service feature set, plus a change of a service subscription record associated with the particular set-top terminal at the business system 168 in headend 160.

An alternative wireless link may be optionally utilized, as shown in FIG. 1. When the warehouse server 122 is optionally configured with wireless communications capability, an alternative wireless link 125 is established between wireless web appliance 110 and the warehouse server 122. As depicted in FIG. 2, a control signal 245 is transmitted over wireless link 145 to warehouse server 122. The control signal is used, in accordance with the invention, to trigger the transmission of an unsolicited message 242 from the warehouse server 122 to controller 162 via connection 124 and the upstream path of cable plant 153 (FIG. 1). The effect of the unsolicited message upon receipt at the controller 162 is similar to that described above in the text accompanying reference numeral 232.

Because the field technician may receive real time status information from the set-top terminal 120 to verify a desired configuration change, the wireless link 145 (FIG. 1) does not necessarily need be arranged as a bi-directional link. However, in some applications of the invention, it may be desirable to implement bi-directional wireless communications between the warehouse server 122 and the wireless web appliance 110.

Figure 4:
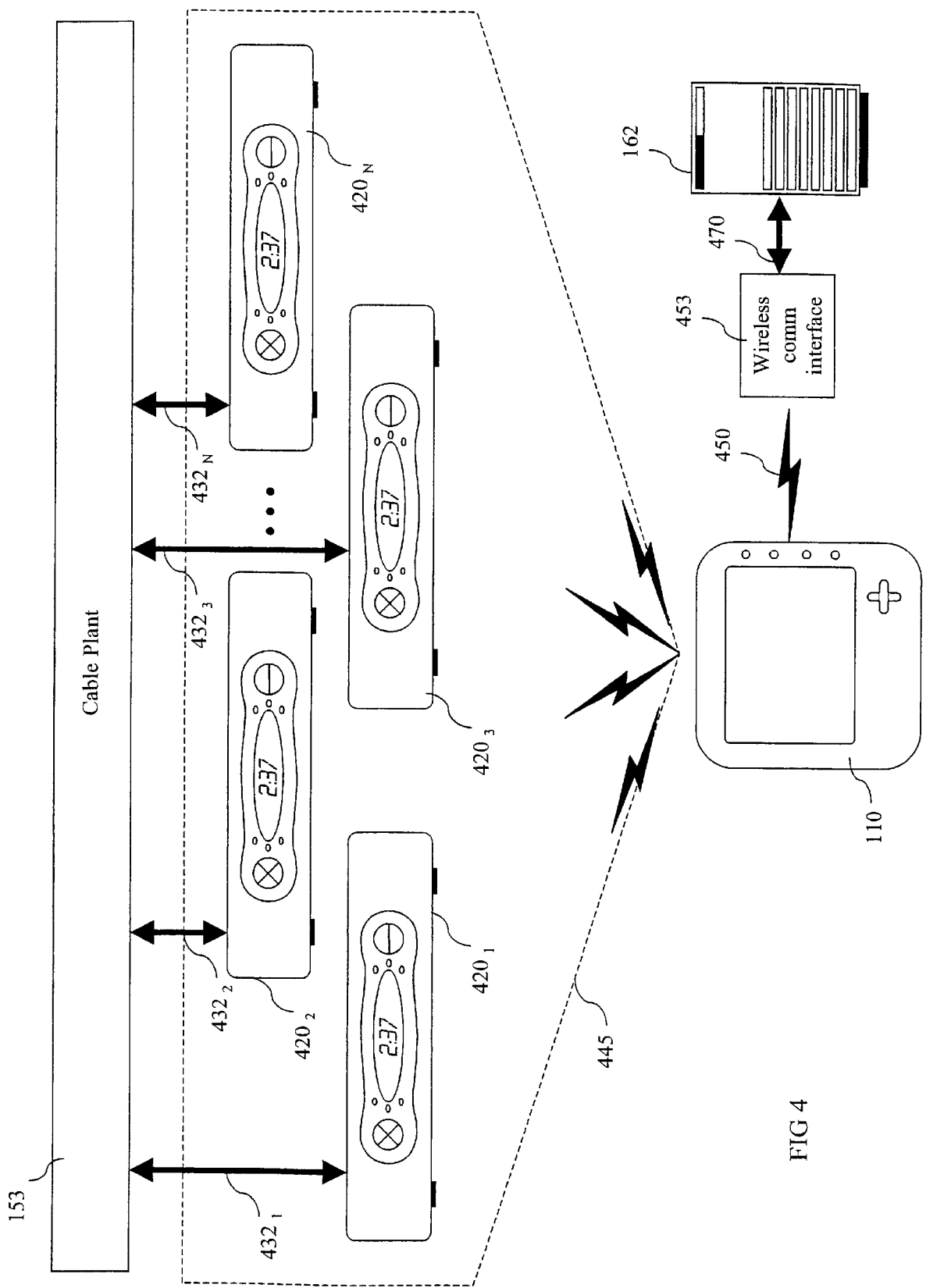
FIG. 4 illustrates a wireless web appliance as used in a broadcasting arrangement to simultaneously configure multiple set-top terminals.

Referring now to FIG. 4, an illustrative arrangement is depicted where the wireless web appliance 10 is arranged to configure a plurality of set-top terminals $420_1$, $420_2$ . . . $420_N$. Each set-top 420 is provided with wireless communications capability in a similar manner as shown with set-top terminal 120 in FIG. 1 and described in the accompanying text. Each set-top terminal 420 is bi-directionally coupled to cable plant 153, as shown.

Wireless web appliance 110 is arranged to transmit a wireless control signal over an area indicated by reference numeral 445 using a broadcast methodology, and each of the set-top terminals 420 is arranged to receive the broadcast signal. The broadcast control signal triggers the transmission of unsolicited messages to controller 162 to implement, for example, a wide-scale configuration change. Thus, in accordance with the invention, the wireless web appliance 110 may interact with a large population of set-top terminals in the warehouse. Such interaction may be beneficial, or example, to run a test on a large population of set-tops from a single test unit.

An alternative embodiment of the invention may be realized by arranging controller 162 with an optional wireless communication interface 453, as shown in FIG. 4. In this embodiment, the wireless web appliance 110 sends an unsolicited message over wireless link 450 that is received by the wireless communications interface 453 and relayed to the controller 162 at the headend 160. The receipt of the unsolicited message triggers a configuration change to be implemented for one or more of the set-top terminals 420, in accordance with the invention. That is, wireless web appliance 110 may be used to implement a configuration change for a particular set-top by through direct wireless communications with the controller 162, or trigger a configuration change that is implemented for a population of set-top terminals. As described above, the configuration change is implemented by modifying business and/or technical records and the headend, downloading configuration data to the set-top terminals at issue, or by performing a combination of record modification and configuration data downloading.

Figure 5:
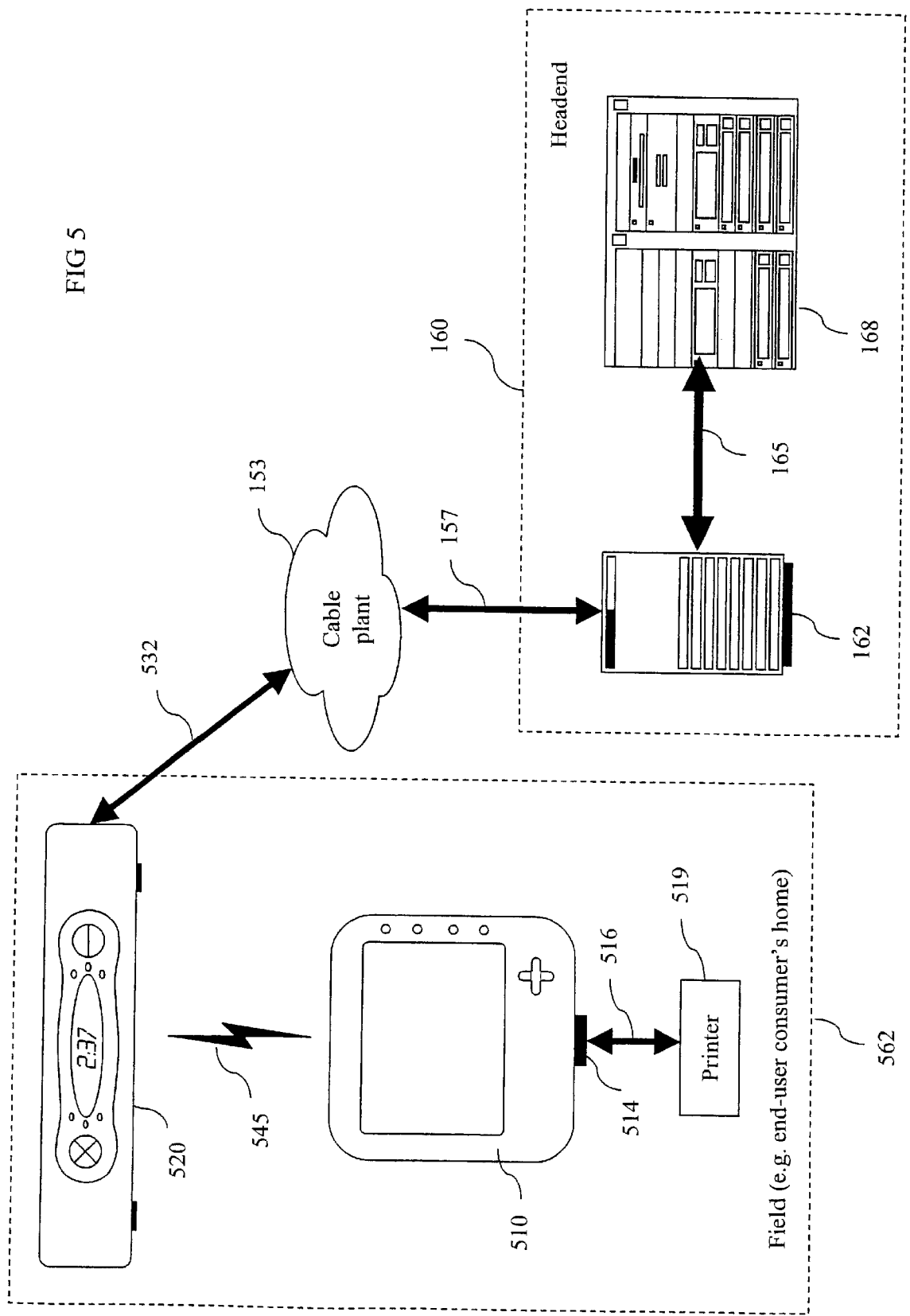
FIG. 5 is a simplified functional block diagram of an illustrative embodiment of the invention including a set-top terminal and a wireless web appliance that are arranged for use in a field environment.

FIG. 5 shows an arrangement of the invention that is suited for field use of the inventive wireless web appliance. As shown, wireless web appliance 510 communicates over wireless link 545 to a set-top terminal 520 that is located in the field, typically a customer's home or business. Set-top terminal 520 is similar in form and operation to set-top terminal 120 in FIG. 1. Similarly, wireless web appliance 510 is embodied in hardware that is comparable to that shown in FIG. 1. However, appropriate changes in application software may be made to suit the wireless web appliance to its particular field application. In addition, optional hardware interfaces such as the external device interface 514 may be advantageously implemented for field applications. For example, as shown in FIG. 5, an external portable printer may be connected to wireless web appliance 510 with cable 516 through interface 514. Such external devices may provide field technicians additional tools to resolve problems and better serve MSO customers.

Set-top terminal 520 is coupled to cable plant 153 via connection 532. Cable plant 153 is coupled, in turn, to controller 152 via connection 157 in headend 160. Business system 168 is coupled to controller 162 via connection 165. Cable plant 153, controller 162 and business system 168 are similarly arranged as their counterparts shown in FIG. 1 and described in the accompanying text.

Figure 6:
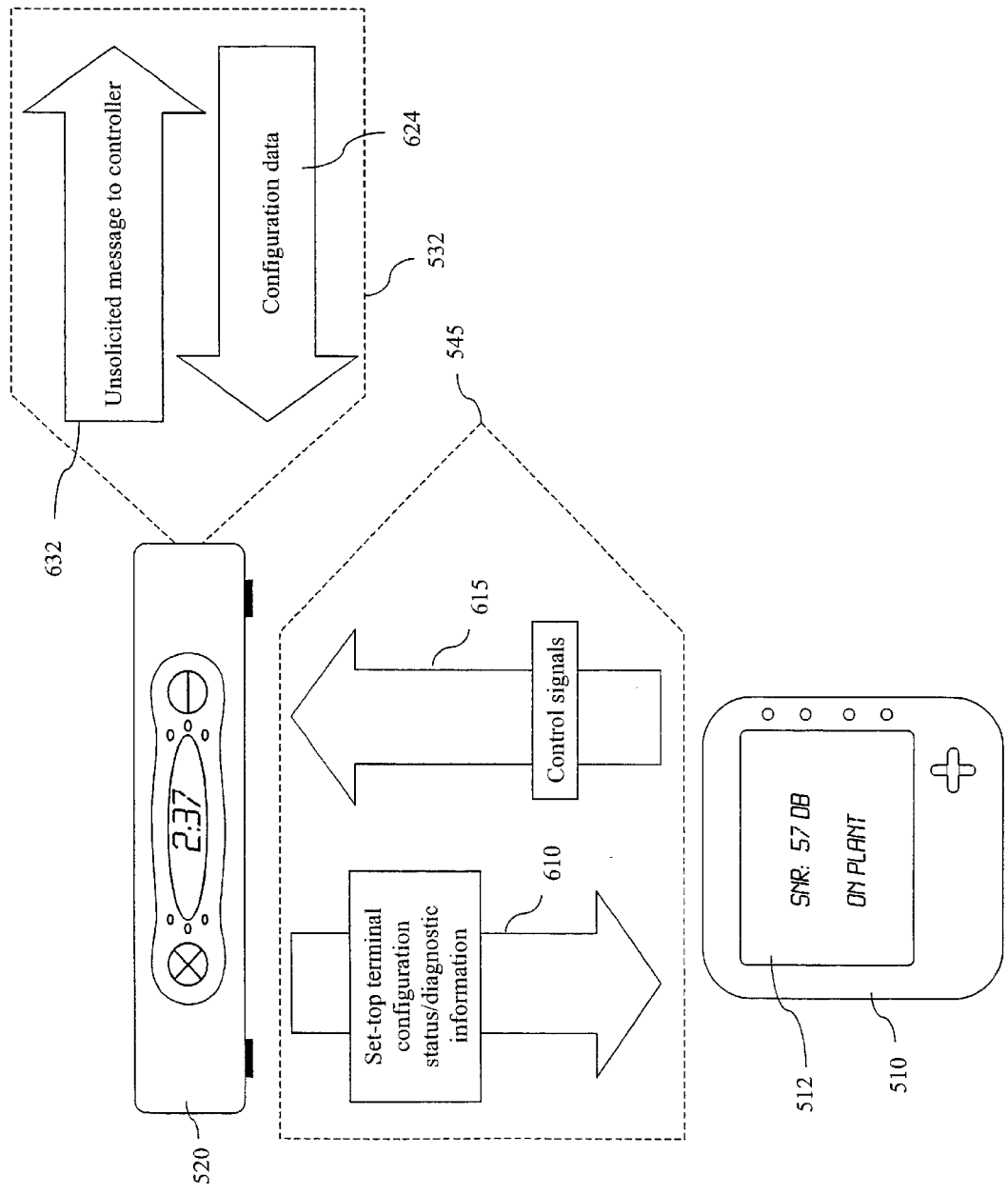
FIG. 6 depicts details of the signal and data flow among a wireless web appliance, set-top terminal, and controller, as illustratively arranged for use in a field or consumer environment.

Referring now to FIG. 6, details of the signal and data flow among the wireless web appliance 510, set-top terminal 520, and controller 162 (FIG. 5), are depicted in this illustrative field application of the invention. As with the preceding illustrative embodiments, set-top terminal configuration status and/or diagnostic information 610 is returned to wireless web appliance 510 on wireless link 545, as shown. In addition, wireless web appliance 520 generates control signals 615 that are used to trigger the transmission of an unsolicited message 632 from the set-top terminal 520 to controller 162 via connection 532 and the upstream path of cable plant 153 (FIG. 5). The unsolicited message, in accordance with the invention, may prompt diagnosis and troubleshooting of set-top terminal and peripheral device faults, system performance data capture, the provisioning of services and features, service call scheduling and logging, and electronic signature capture.

A test signal (or a series of such signals) may be sent via the downstream path of cable plant 153 from the controller 162 to the set-top terminal 520 in response to the transmission of the unsolicited message 632 that is triggered by the control signal 615 from wireless web appliance 510. Such test signals can be used to perform a diagnosis of the set-top terminal performance and the coupled transport and translation medium (e.g., the HFC network and/or co-axial cable). Troubleshooting of related peripheral equipment that is coupled to the set-top terminal, for example a television at the customer's location, may also be facilitated by receipt of test signals. Various configuration changes may be implemented via configuration data 624 that is downloaded from the controller 162 as part of the diagnosis and troubleshooting method in the field. The field technician, in accordance with the invention, may obtain status, diagnostic, and performance data 610 from set-top terminal 520 in real time as the test signals are received by the set-top terminal 520 and configuration changes are implemented. A cycle of test and configure may be performed in an iterative manner in order to identify and correct faults. The inventive arrangement thus advantageously provides a set-top, peripheral and system evaluation tool in the field that has equivalent capability to that provided in the MSO's factory, laboratory or product-test facility. Advantageously, use of the inventive arrangement in the field may reduce service call duration and the extent of field support required from the MSO call center.

Diagnostic data pertaining to the set-top terminal and its connection to the HFC network, as well as overall network performance may be captured and returned to the wireless web appliance 510. Such returned information is collectively indicated by reference numeral 610 in FIG. 6. Wireless web appliance 510 processes the status information 610 for display of pertinent information on display 512. For example, as shown on display 512 in FIG. 5, the wireless web appliance 510 has queried the set-top terminal 520 as to the status of the signal-to-noise ("SNR") of the link from the headend 160 and confirmation that the set-top terminal is on plant.

Services and features may be provisioned by the field technician in a similar manner to the inventive diagnosis and troubleshooting feature set described above. For example, a change to a subscriber service, such as the addition of a premium channel set, may be implemented in the field by sending a control signal 615 indicative of the desired configuration change from the wireless web appliance 510 to the set-top terminal 520 that is located in the subscriber's home. The transmission of an unsolicited message 632 is thus triggered which, upon arrival at the controller 162, is processed and an appropriate change is made to the controller database and/or business system record at the headend 160 to implement the upstream configuration change. Any required downstream configuration change (i.e., at the set-top terminal 520 itself) is effectuated by the transmission and receipt of configuration data 624 that authorizes the set-top terminal to receive the illustrative premium channel set and thus complete the provision of the desired service end-to-end.

Figure 7:
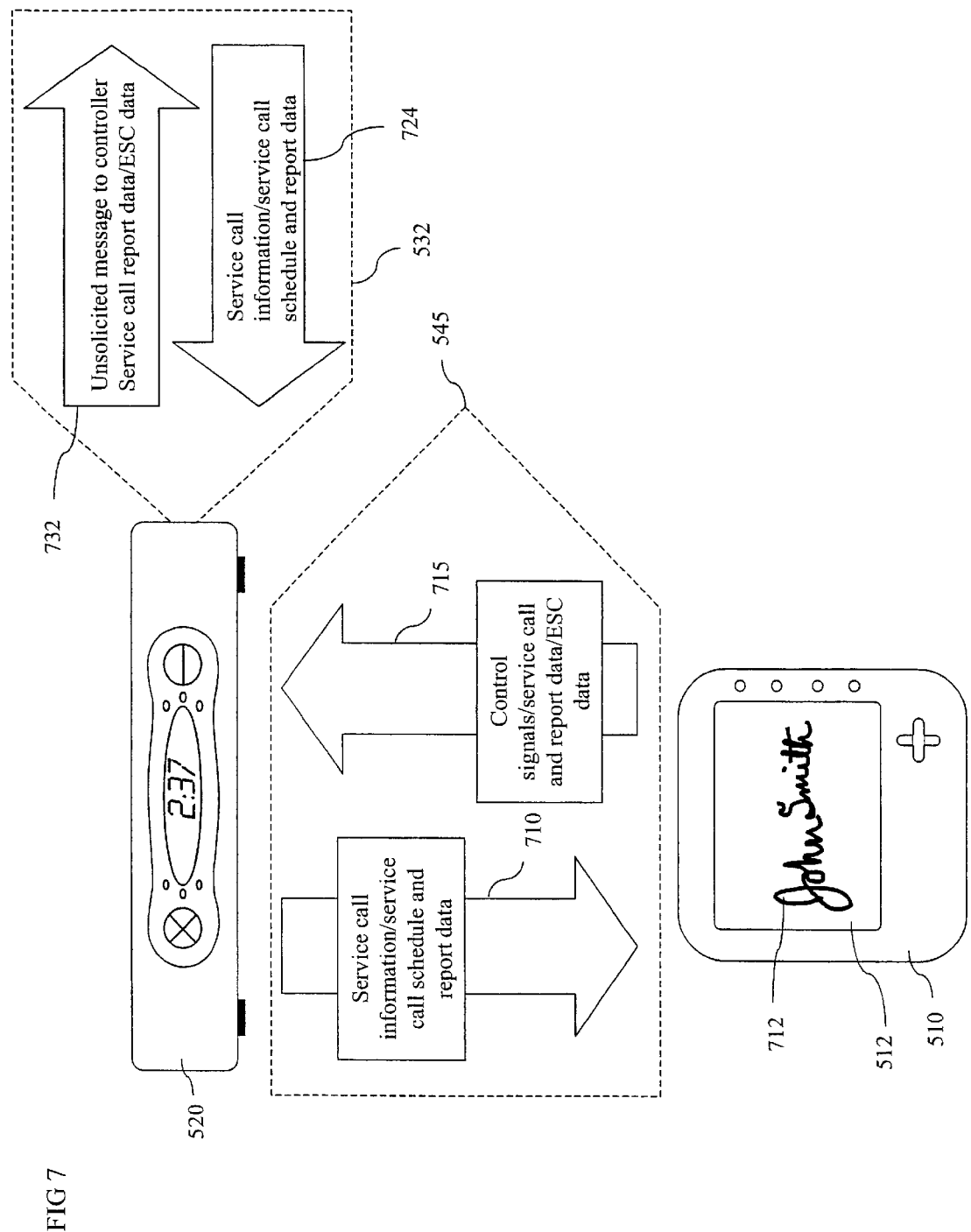
FIG. 7 depicts details of the signal and data flow among a wireless web appliance, set-top terminal, and controller, as illustratively arranged for assisted service call scheduling and logging and electronic signature capture.

Assistance with service call scheduling and service call logging and reporting in the field is another feature of the inventive arrangement. Referring to FIG. 7, a field technician may call up information about a present or upcoming service call by sending control signals 715 to set-top terminal 520 to thereby trigger an unsolicited message 732 to query the controller 162 or business system 168. Information such as service call address, the nature of the complaint or service requested by the customer, service history, subscriber information, user profile, business and subscription information, set-top terminal configuration and other pertinent information and data may be downloaded for display on the wireless web appliance 510 under the control of the field technician. Likewise, service call schedules and locations for the field technician (and other colleagues in the service department) may be queried with an unsolicited message 732 and responsive data downloaded upon command. Such service call information and schedule data is collectively indicated in FIG. 7 by reference numeral 710.

The field technician may use the wireless web appliance 510 to write service reports and complete service call logs that may be uploaded to the headend 168. Data 715 pertaining to such reports and logs is captured by the user interface of wireless web appliance 510 and transmitted via wireless link 545 to set-top terminal 520. The service call and log data is transmitted in message 732 to the controller 162 over the upstream path of cable plant 153. The data is processed for storage or to prompt the appropriate data download to set-top terminal 520 that may be subsequently relayed as data 710 to wireless web appliance 510, as illustrated in FIG. 7.

Electronic signature capture ("ESC") is also facilitated by the inventive arrangement. As shown in FIG. 7, the customer's signature (in this illustrative example, "John Smith") is captured on the touch sensitive display 712 of the wireless web appliance 510. ESC may be desirable to implement in many applications of the invention as a way to allow customers to authorize features and services provided by the MSO. For example, in the field, the ESC feature may be used as an acknowledgment that the service call was completed satisfactorily, or to authorize the immediate provisioning of new services or features. The captured ESC data is routed to the headend 160 for processing in data signals 715 and 732 over wireless link 545 and cable plant 153, respectively.

Figure 8:
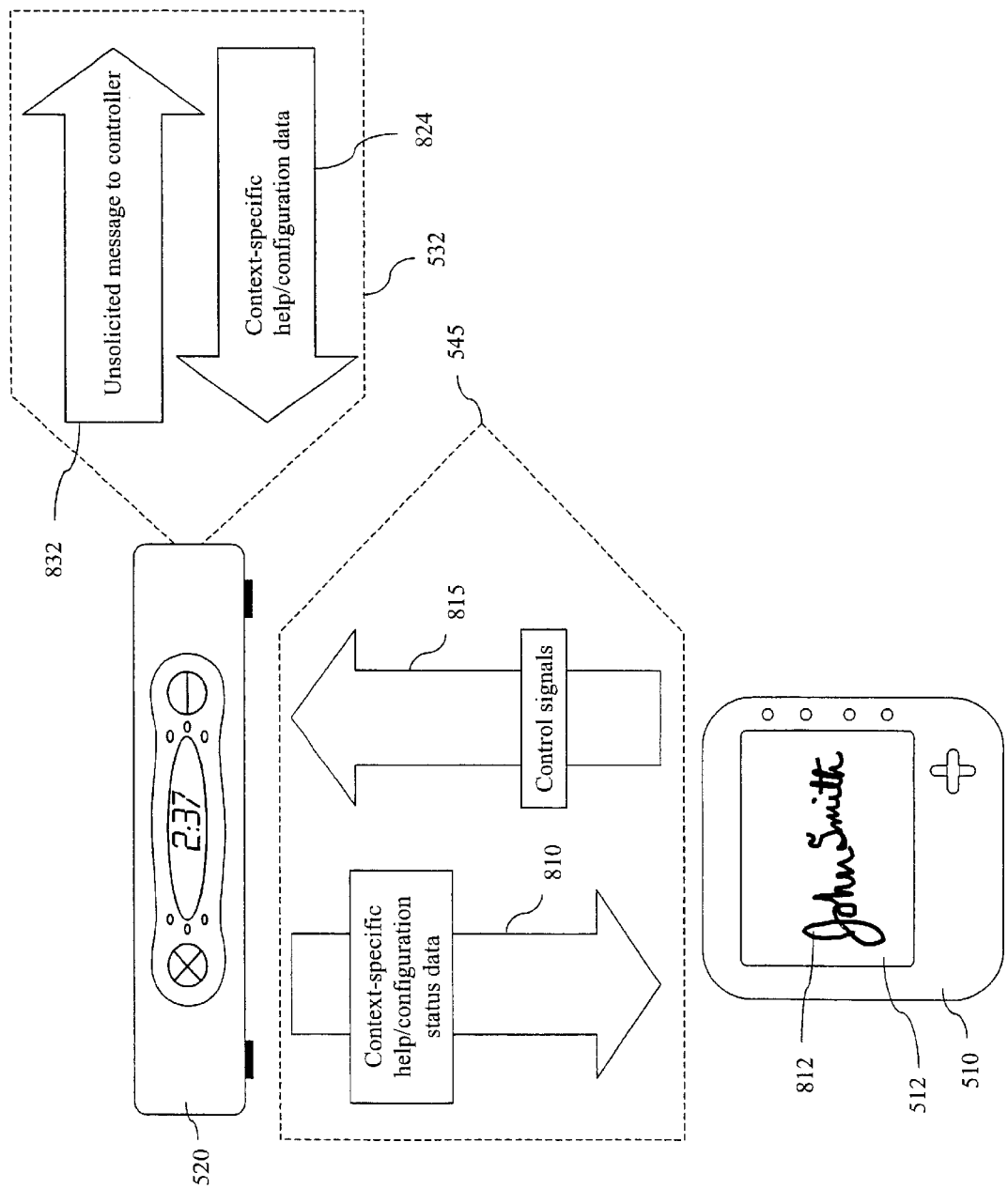
FIG. 8 is a simplified functional block diagram of an illustrative embodiment of the invention showing an arrangement of a wireless web appliance that is adapted for use in a consumer application; and, FIG. 9 is a simplified functional block diagram of an illustrative embodiment of the invention showing an application of a wireless web appliance for configuring peripheral devices.

FIG. 8 is a simplified functional block diagram of an illustrative embodiment of the invention showing an arrangement of a wireless web appliance that is adapted for use in a consumer application. In this application, wireless web appliance 510 may advantageously be utilized to supplement or replace existing remote control units.

The use of an unsolicited message 832 in this embodiment allows access to a large database of information and tools at the headend that may be downloaded under the control of the wireless web appliance 510. For example, context-sensitive help 824 may be downloaded from the controller and transmitted as data 810 over wireless link 545 to assist and enrich the user's experience in controlling services and the feature set enabled by the set-top terminal 520.

A consumer may also make configuration changes to the set-top terminal (where the scope of user-selectable configuration changes would likely be limited to those authorized to a field technician). In accordance with the invention, a consumer triggers the transmission of unsolicited message 832 to controller 162 by sending control signals 815 from wireless web appliance 510. The unsolicited message prompts a configuration record change to be performed a the headend 160, or triggers in a configuration download to the set-top terminal 520, as described above. In addition, wireless web appliance 510 may control and configure peripheral devices as described in detail below and shown in FIG. 9.

As shown in FIG. 8, a consumer may use ESC in the home environment to securely order services, like pay-per-view events, from the MSO. In addition, ESC may facilitate electronic signatures to be appended to email messages and enhance other interactive experiences such as online shopping and auctions. As shown, a consumer may enter a signature 812 (in this case "John Smith") on the touch sensitive screen 512 using a stylus.

Figure 9:
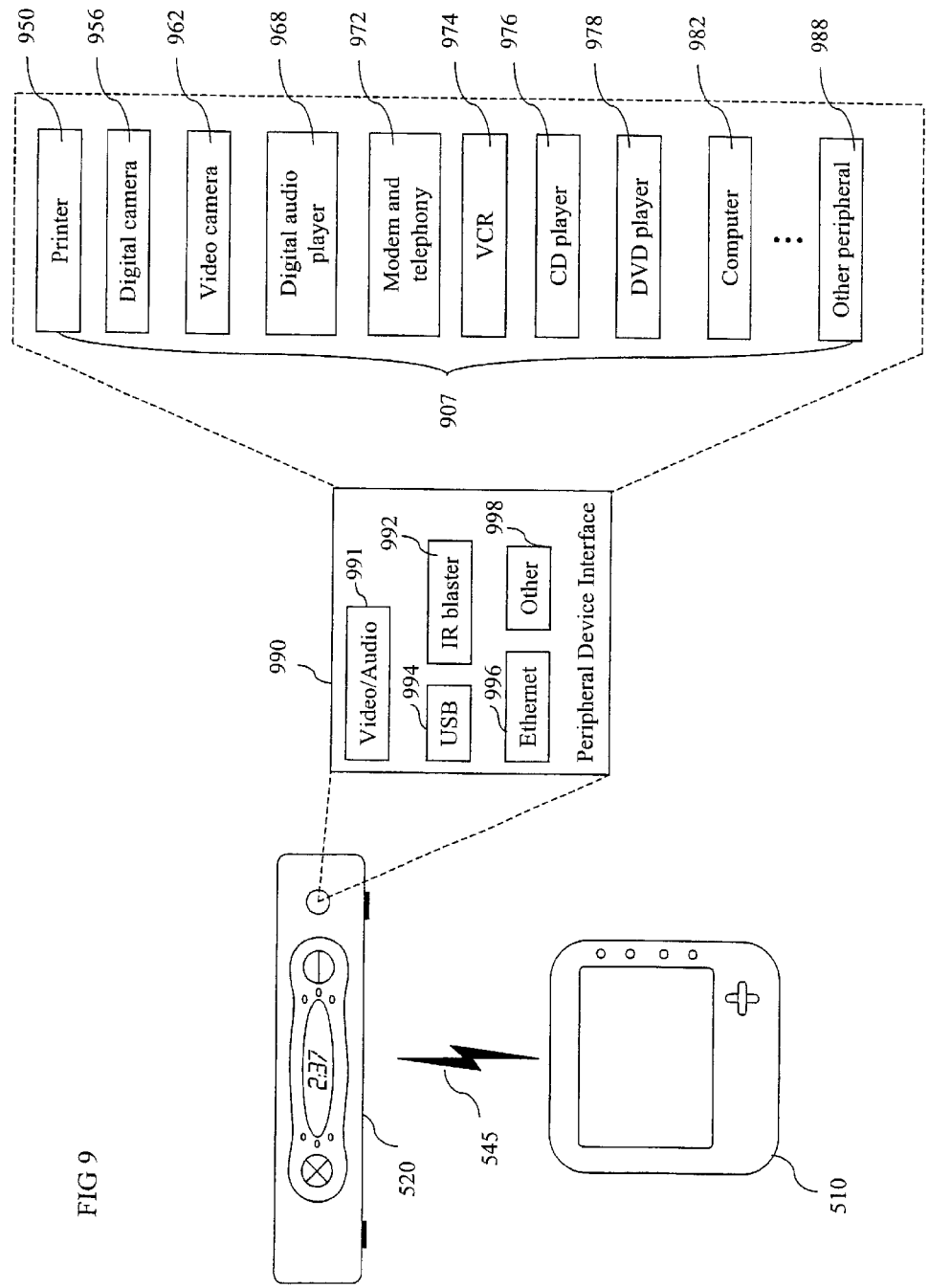

FIG. 9 is a simplified functional block diagram of an illustrative embodiment of the invention showing an application of a wireless web appliance for configuring peripheral devices. This embodiment may be used in consumer applications as well as by MSO field technicians. As shown, a set-top terminal 520 and wireless web appliance 510 are coupled by wireless link 545. A group of peripheral devices are collectively designated by reference numeral 907 in FIG. 9. Such peripheral devices are typically associated with set-top terminals and the information and entertainment services provided by the MSO. One or more peripheral device may be located in a customer's home. The peripheral devices in FIG. 8 include printer 950, digital camera 956, video camera 962, digital audio (e.g., MP3) player 968, modem and telephony peripheral equipment 972, video cassette recorder ("VCR") 974, CD player 976, DVD player 978, and computer 982. Other peripheral equipment and consumer electronic equipment not specifically enumerated here is indicated by reference numeral 988 in FIG. 9.

Typically, peripheral devices require some degree of configuration and set-up to invoke desired features and functions or set operating parameters. Some settings such as local time and user-preferences (for example language, stored channels or stations, picture and audio settings) must generally be set-up by the user. Thus, the illustrative embodiment depicted in FIG. 9 contemplates both field use by service technicians, as well as home use by an end-user consumer.

A peripheral device 907 may be coupled to the set-top terminal 520 via a hardwire or wireless connection through a peripheral device interface 990 of the set-top terminal 520. Many set-top terminals typically include one or more of the peripheral device interface connections shown in FIG. 9. Thus, the particular interfaces used will depend on the requirements of the specific application of the invention. The peripheral device interfaces shown in FIG. 9 include conventional video and audio interfaces 991, an IR blaster 992, a universal serial bus ("USB") interface 994, and an Ethernet networking interface 996. Other interfaces, including IEEE 1394-compliant interfaces (known as "Firewire"®), RS-232 serial and parallel interfaces, RF wireless interfaces such as IEEE 802.11b, Bluetooth®, HomeRF® and RangeLan® are collectively noted as "Other" interfaces 998 in FIG. 9.

To set-up and configure the peripheral devices, the wireless web appliance 510 sends a control signal to the set-top terminal 520 that is indicative of a desired action. For example, the VCR 974 recording start and stop time and television channel to be recorded may be set using the user interface provided by the wireless web appliance 510 as an alternative to conventional set-up methods (such as programming the VCR using an on-screen display on a connected television). A peripheral configuration application running on the wireless web appliance 510 provides an interactive menu that allows the user to enter the pertinent data to set the VCR 974 to the desired state. The captured data from the wireless web appliance 510 is transmitted via wireless link 545 to set-top terminal 520. Set-top terminal 520 may relay the configuration data to the VCR 974 via a hardwire interface (such as the USB interface 994) or via the IR blaster 992 to effectuate the desired settings. Product-specific VCR programming instructions 824 may be downloaded, as necessary, from the controller 162 in response to a received unsolicited message 832 transmitted from set-top terminal 520. Such product-specific programming instructions may be required in some applications due to the large number of consumer electronic products available in the market and the widely divergent methods used to configure them. Advantageously then, the invention provides access to a very large centralized database of product-specific programming codes at the headend that may be updated on a regular basis to keep pace with rapidly evolving consumer electronics industry.

Other embodiments of the invention may be implemented in accordance with the claims that follow.

What is claimed is:

1. A method of configuring a set-top terminal with a wireless web appliance using configuration data received from a controller at a headend located remotely from the set-top terminal, the method comprising the steps of:
    establishing a wireless communications path between the wireless web appliance and the set-top terminal;
    establishing an upstream communications path and a downstream communications path between the set-top terminal and the controller;
    receiving an unsolicited message at the controller over the upstream communications path in response to a control signal transmitted by the wireless web appliance over the wireless communications path; and
    implementing a configuration change in response to the unsolicited messages
        wherein set-top terminal configuration status is transmitted over the wireless link to the wireless web anpliance.

2. The method of claim 1 wherein the configuration change includes transmitting configuration data to the set-top terminal over the downstream communications path.

3. A method of configuring a set-top terminal with a wireless web appliance using configuration data received from a controller at a headend located remotely from the set-top terminal, the method comprising the steps of:
    establishing a wireless communications path between the wireless web appliance and the set-top terminal;
    establishing an upstream communications path and a downstream communications path between the set-top terminal and the controller;
    receiving an unsolicited message at the controller over the upstream communications path in response to a control signal transmitted by the wireless web appliance over the wireless communications path; and
    implementing a configuration,
        wherein the configuration change comprises implementing a configuration record change at the headend.

4. The method of claim 3 wherein the configuration record is stored on a business system coupled to the controller.

5. A method of configuring a set-top terminal with a wireless web appliance using configuration data received from a controller at a headend located remotely from the set-top terminal, the method comprising the steps of:
    establishing a wireless communications link between the wireless web appliance and the set-top terminal;
    establishing an upstream communications path and a downstream communications path between the set-top terminal and the controller;
    transmitting, from the set-top terminal, an unsolicited message to the controller over the upstream communications path in response to a control signal transmitted by the wireless web appliance over the wireless communications path; and
    receiving at the set-top terminal, the configuration data over the downstream communications path from the controller, where the controller sends the configuration data in response to the unsolicited message,
        wherein the configuration data comprises middleware.

6. A method of configuring a set-top terminal with a wireless web appliance using configuration data received from a controller at a headend located remotely from the set-top terminal, the method comprising the steps of:
    establishing a wireless communications link between the wireless web appliance and the set-top terminal;
    establishing an upstream communications path and a downstream communications path between the set-top terminal and the controller;
    transmitting, from the set-top terminal, an unsolicited message to the controller over the upstream communications path in response to a control signal transmitted by the wireless web appliance over the wireless communications path; and
    receiving at the set-top terminal, the configuration data over the downstream communications path from the controller, where the controller sends the configuration data in response to the unsolicited message,
        wherein the configuration data comprises context-sensitive help.

7. A method of configuring a set-top terminal with a wireless web appliance using configuration data received from a controller at a headend located remotely from the set-top terminal, the method comprising the steps of:
    establishing a wireless communications link between the wireless web appliance and the set-top terminal;
    establishing an upstream communications path and a downstream communications path between the set-top terminal and the controller;

transmitting, from the set-top terminal, an unsolicited message to the controller over the upstream communications path in response to a control signal transmitted by the wireless web appliance over the wireless communications path; and receiving at the set-top terminal, the configuration data over the downstream communications path from the controller, where the controller sends the configuration data in response to the unsolicited message, further including a step of capturing an electronic signature on the wireless web appliance.

8. The method of claim 7 wherein the captured electronic signature provides authorization of a service to be delivered via the set-top terminal.

9. The method of claim 7 wherein the authorized service comprises a pay-per-view event.

10. A method of configuring a set-top terminal with a wireless web appliance using configuration data received from a controller at a headend located remotely from the set-top terminal, the method comprising the steps of:

establishing a wireless communications link between the wireless web appliance and the set-top terminal;

establishing an upstream communications path and a downstream communications path between the set-top terminal and the controller;

transmitting, from the set-top terminal, an unsolicited message to the controller over the upstream communications path in response to a control signal transmitted by the wireless web appliance over the wireless communications path; and receiving at the set-top terminal, the configuration data over the downstream communications path from the controller, where the controller sends the configuration data in response to the unsolicited message, wherein the configuration data comprises data used to configure peripheral equipment coupled to the set-top terminal.

11. The method of claim 10 wherein the peripheral equipment comprises consumer electronic equipment.

12. The method of claim 10 wherein the set-top terminal is included within a population of set-top terminals and the wireless web appliance operates in a broadcast mode.

13. A method of configuring a set-top terminal with a wireless web appliance using configuration data received from a controller at a headend located remotely from the set-top terminal, the method comprising the steps of:

establishing a wireless communications link between the wireless web appliance and the set-top terminal;

establishing an upstream communications path and a downstream communications path between the set-top terminal and the controller;

transmitting, from the set-top terminal, an unsolicited message to the controller over the upstream communications path in response to a control signal transmitted by the wireless web appliance over the wireless communications path; and receiving at the set-top terminal, the configuration data over the downstream communications path from the controller, where the controller sends the configuration data in response to the unsolicited message, the configuration data further includes service call data.

14. The method of claim 13 wherein the service call data includes service call scheduling information.

15. A method of configuring a set-top terminal with a wireless web appliance using configuration data received from a controller at a headend located remotely from the set-top terminal, the method comprising the steps of:

establishing a wireless communications link between the wireless web appliance and a server;

establishing a downstream communications path between the set-top terminal and the controller;

transmitting, from server, an unsolicited message to the controller over an upstream communication path in response to a control signal transmitted by the wireless web appliance over the wireless communications path; and receiving at the set-top terminal, the configuration data over the downstream communications path from the controller, where the controller sends the configuration data in response to the unsolicited message.

16. A wireless web appliance device for configuring a set-top terminal using configuration data received from a controller at a headend located remotely from the set-top terminal, comprising:

a processor for generating an unsolicited message for transmission to a remote controller, the remote controller being arranged to download the configuration data to a remote set-top terminal in response to the unsolicited message;

a wireless transceiver coupled to the processor for transmitting the unsolicited message to the controller and for establishing a wireless communications link with the remote set-top terminal; and a user interface for displaying a configuration status of the remote set-top terminal to a user, the configuration status set in response to the configuration data downloaded from the controller and received from the remote set-top terminal over the wireless communications path.

17. The wireless web appliance of claim 16 further including a peripheral port.

18. The wireless web appliance of claim 16 further including a user input device.

19. The wireless web appliance of claim 16 further including a display.

20. The wireless web appliance of claim 19 wherein the display comprises a touch-sensitive panel.

21. A wireless web appliance device for configuring a set-top terminal using configuration data received from a controller at a headend located remotely from the set-top terminal, comprising:

a processor for controlling transmission of an unsolicited message from the remote set-top terminal to a controller where, in response to the unsolicited message, the downloads the configuration data to the remote set-top terminal;

a wireless transceiver for transmitting an unsolicited message to an controller and for establishing a wireless communications link with the remote set-top terminal; and a user interface for displaying a configuration status of the remote set-top terminal to a user, the configuration status set in response to the configuration data downloaded from the addressable controller and received from the remote set-top terminal over the wireless communications path.

* * * * *

UNITED STATES PATENT AND TRADEMARK OFFICE
CERTIFICATE OF CORRECTION

PATENT NO. : 6,687,486 B2  
DATED : February 3, 2004  
INVENTOR(S) : Grzeczkowski It is certified that error appears in the above-identified patent and that said Letters Patent is hereby corrected as shown below:

Column 6,  
Line 22, change "set up set-top" to -- set up a set-top --.

Column 7,  
Line 48, change "set-top by through" to -- set up through --.

Column 10,  
Line 22, change "performed a the" to -- performed the --.  
Line 46, change "device" to -- devices --.

Column 11,  
Line 58, change "messages" to -- message, --.

Column 14,  
Lines 52 - 53, change "the downloads" to -- the controller downloads --.  
Line 56, change "an controller" to -- a controller --.

Signed and Sealed this

Third Day of May, 2005

JON W. DUDAS  
*Director of the United States Patent and Trademark Office*